United States Patent [19]

Rosing

[11] 4,017,690
[45] Apr. 12, 1977

[54] GUARD CIRCUIT FOR GROUND START TELEPHONE EQUIPMENT

[75] Inventor: George Leonard Rosing, Sylmar, Calif.

[73] Assignee: General Telephone Company of California, Santa Monica, Calif.

[22] Filed: July 2, 1976

[21] Appl. No.: 702,007

[52] U.S. Cl. .......................................... 179/18 AH
[51] Int. Cl.² .......................................... H04M 7/10
[58] Field of Search ............................. 179/18 AH

[56] References Cited

UNITED STATES PATENTS

| | | | |
|---|---|---|---|
| 3,491,213 | 1/1970 | Gilboy et al. | 179/18 AH |
| 3,700,822 | 10/1972 | Fritschi | 179/18 AH |

*Primary Examiner*—William C. Cooper
*Attorney, Agent, or Firm*—Ralph B. Pastoriza

[57] ABSTRACT

A guard circuit is designed to be inserted in a two wire trunk between a central office and customer terminal equipment for the purpose of reducing the time period that the customer terminal equipment, for example, a private automatic branch exchange (PABX), is subject to glare. Essentially, the guard circuit monitors the various potentials of the two wire trunk from the central office. Upon release of an established connection from the central office, ground is removed from the positive line and negative potential is applied to the negative line. The guard circuit recognizes this change in potential and separates the customer terminal equipment from the central office until the customer terminal equipment is released and reconditioned. Glare cannot occur during the separation interval and thus the time period during which glare could occur is substantially reduced.

5 Claims, 2 Drawing Figures

GUARD CIRCUIT FOR GROUND START TELEPHONE EQUIPMENT

This invention relates to auxiliary circuits for telephone equipment and more particularly to a specially designed guard circuit for ground start telephone equipment.

BACKGROUND OF THE INVENTION

Ground start type two-way trunk circuits between a central office and customer terminal equipment as presently designed by many manufacturers are subject to a condition referred to in the telephone industry as "glare." Glare is defined as a condition wherein the two wire trunk circuit can be seized from both ends simultaneously or, after release by the central office, the customer terminal equipment trunk circuit can again be seized by a new call from the central office prior to readying of the customer terminal circuits to a proper condition to receive such call.

As an example, the customer terminal equipment might be a ground start private automatic branch exchange (PABX) subject to receiving several telephone calls put through a central office. After release or termination of the call from the central office and after the forced release of the two wire trunk at the PABX terminal by a customer at a station serviced by the PABX, there is an interval of time of approximately three hundred or more milliseconds during which the PABX trunk circuits can be seized by a new call prior to release of the customer station on the previous call, even though the customer has hung up his telephone. When this situation occurs or when simultaneous attempts to seize the trunk wire line from both ends occur, the referred to condition of "glare" exists.

It would be highly desirable if the foregoing "unguarded" interval of time could be substantially reduced thereby minimizing the possibility of "glare." The proper readying of the PABX trunk circuits to receive a subsequent call after release of a previous call depends upon the release and operate time of line equipment relays and the like at the central office. Since these latter circuits require a finite time to operate, it is not possible to reduce the referred to unguarded time interval to zero. Thus, there is virtually no way to guard against a simultaneous seizure from each end. On the other hand, the operating time of the line equipment relays and circuits of the central office is sufficiently small that the unguarded interval involved could be substantially reduced.

BRIEF DESCRIPTION OF THE PRESENT INVENTION

The present invention contemplates the provision of a guard circuit in the form of an applique for connection into existing two-wire trunk circuits between a central office and customer terminal equipment such as a PABX, or alternatively, a circuit which can be designed directly into newly manufactured PABX trunk circuits.

Essentially, the circuit includes a switch means connected to the positive and negative two wire trunk lines between the central office and customer terminal equipment which switch means is responsive to removal of positive potential from the positive line and application of negative potential to the negative line when a call on the two wire trunk is released at the central office, to disconnect or separate the central office and terminal equipment.

Further included is a monitoring means connected between the normal ground lead means at the customer terminal equipment and the switch means responsive to removal of positive potential from the ground lead means upon release and reconditioning of the customer terminal equipment to receive a subsequent call, to reset the switch means. This resetting of the switch means reconnects the two wire trunk between the central office and terminal equipment. The guard circuit thus reduces the time interval during which glare could occur by eliminating the possibility of glare during the time that the two wire trunk is disconnected.

BRIEF DESCRIPTION OF THE DRAWINGS

The foregoing as well as further features and advantages of the guard circuit of this invention will be better understood by referring to the accompanying drawings in which.

DETAILED DESCRIPTION OF THE INVENTION

Figure 1:
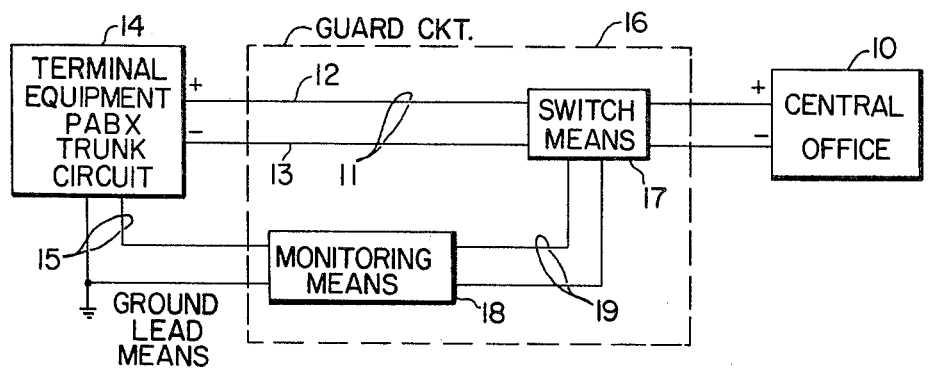
FIG. 1 is a basic block diagram of the guard circuit of this invention connected into a two-wire trunk line between a central office and ground start customer terminal in the form of a PABX trunk circuit; and, FIG. 2 is one example of a complete circuit made up of fast acting transistors and relays incorporated in the blocks making up the guard circuit of FIG. 1.

Referring first to FIG. 1, there is shown a central office 10 connected through a two wire trunk 11 comprised of positive and negative lines 12 and 13 to customer terminal equipment which by way of example, comprises a ground start PABX trunk circuit 14, including ground lead means 15.

Normally, telephone calls will take place between the central office and various customer stations leading into the PABX trunk circuit 14 over the two wire trunk 11.

To reduce the risk of "glare" as previously defined herein, there is shown in FIG. 1 a guard circuit enclosed within the dashed lines 16 comprised basically of a switch means 17 and monitoring means 18 connected between the ground lead means 15 and the switch means 17 as by leads 19.

In its broadest aspect, the switch means 17 is responsive to removal of positive potential from the positive line 12 and application of negative potential to the negative line 13 when a call on the two wire trunk is released at the central office 10, to disconnect the two wire trunk circuit between the central office and the PABX trunk circuit. The monitoring means in turn is responsive to removal of positive potential from the ground lead means upon completion of release and reconditioning of the PABX trunk circuit to receive a new call, the monitoring means 18 resetting the switch means 17 to reconnect the two wire trunk between the central office and terminal equipment preparatory to receiving a subsequent call. As discussed heretofore, the time interval involved to re-establish proper conditions for receiving a subsequent call during which entire time the equipment would be subject to glare, may be 300 or more milliseconds. This time interval during which glare could occur is thus reduced by the length of time of separation of the central office and terminal equipment resulting from opening of the two wire trunk by the guard circuit.

Figure 2:
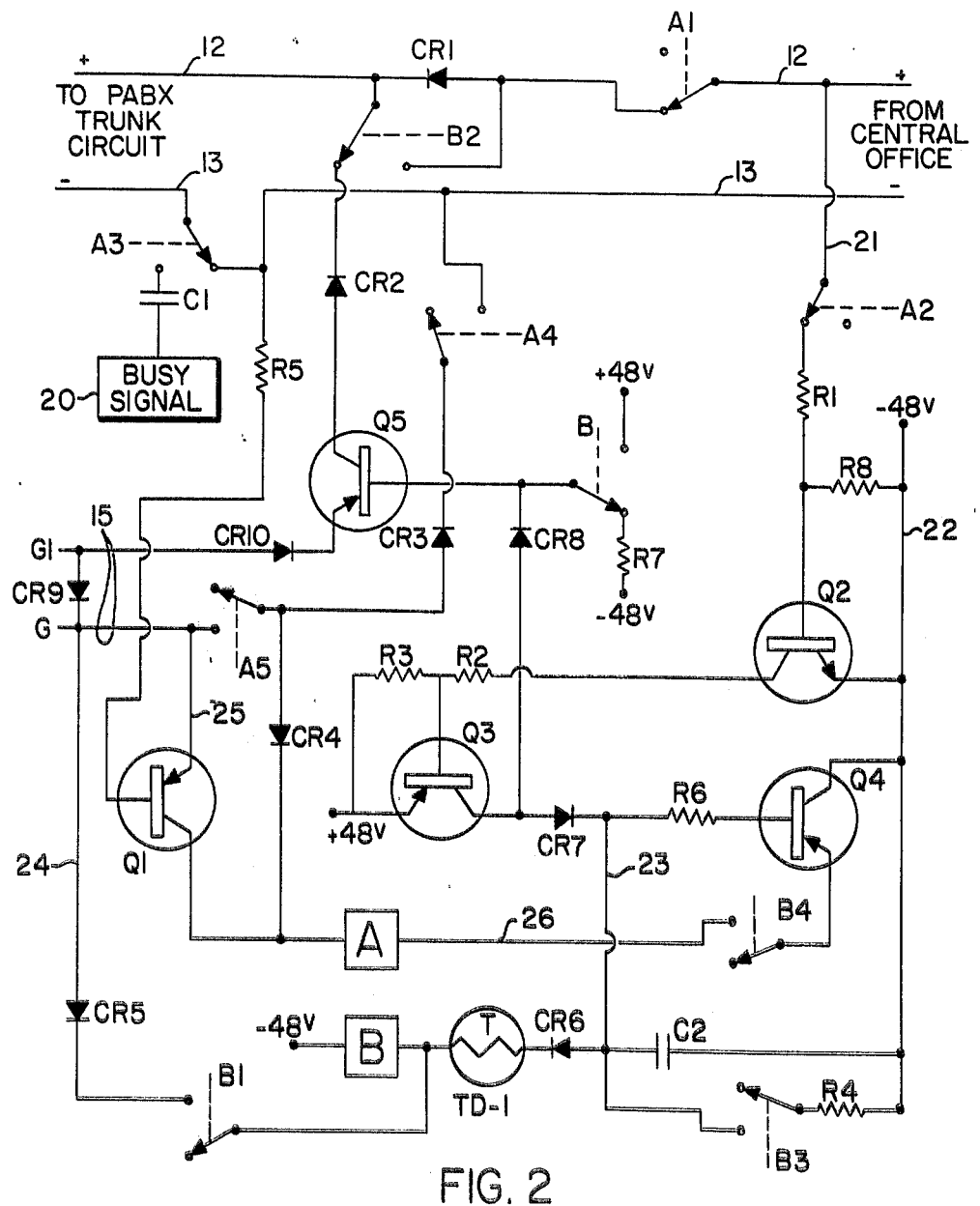

Referring now to FIG. 2, the manner in which the foregoing operation is achieved as well as various further features which may be incorporated in the guard circuit will be better understood.

In FIG. 2, the two wire positive and negative lines of the trunk from the central office to the PABX trunk circuit are again designated by the numerals 12 and 13. The ground lead means from the PABX trunk circuit in turn are shown in the central left portion of FIG. 2 and are designated G1 and G. In some equipment there may be only a single ground lead and in this case, G and G1 are internally connected in the PABX trunk circuit.

Still generally referring to FIG. 2, in the lower portion there is designated by the blocks A and B switching relays which, when energized, will throw the correspondingly lettered switch arms A1 through A5 and B1 through B4, respectively from the solid line positions shown to the other associated terminals. The various switching and monitoring operations described in FIG. 1 as well as certain additional functions are acocmplished by the transistors Q1 through Q5 in cooperation with the referred to relay switches as will now be described.

Referring to the upper right hand portion of FIG. 2, when a telephone call is established between the central office and a customer station connected to the PABX trunk circuit, positive potential is placed on the positive line 12 of the two wire trunk by the central office equipment. This positive potential is allowed to pass to the PABX trunk circuit through the diode CR1. The same positive potential also turns on transistor Q2 through application of the potential to the base terminal of the transistor by way of lead 21, switch arm A2 and resistance R1. Turning on of transistor Q2 will pass current from ground (which is at +48V) through voltage dividing resistance R3 and R2 to the collector of Q2 and emitter thereof to −48V negative potential on line 22. The drop of positive voltage across resistance R3 turns on transistor Q3 and allows this transistor to conduct passing +48V through diode CR7 and resistance R6 to the base of transistor Q4 holding this transistor off.

This same foregoing positive potential also passes through branch lead 23 between the diode CR7 and resistance R6 and diode CR6 to a time delay thermistor TD-1 connected to relay B. The other side of relay B connects to −48V as shown.

Relay B is thus energized after a given delay and upon energization will immediately close all of its associated switch arms B1 through B4. Closing of the switch arm B1 locks the relay coil B in an energized state through normally present positive potential on the ground lead means 15 (G1 and G), lead 24 diode CR5 and now closed switch arm B1 to relay B.

The foregoing energization of relay B also closes relay switch arm B2 shown in the positive line 12 between the central office and PABX trunk circuit thereby shorting the diode CR1 for transmission purposes. The circuit is now prepared to monitor the established telephone connection upon energization of the relay B as will become clearer as the description proceeds.

Assume first that the customer at the station associated with the PABX trunk circuit terminates the telephone call from the central office first. Such release or termination of the PABX trunk circuit results in the positive potential on the ground lead means 15 (G1 and G) being removed which action will thus immediately de-energize relay B resulting in the switch arm B2 across the diode CR1 opening. However, continuity is maintained from the central office through CR1 and thus the trunk is transparent to allow the PABX trunk circuit to perform its normal functions. Although relay B may cycle (release and re-operate) continuity will be maintained.

The basic problem of "glare" occurs when the call at the central office is released first. When this release occurs, the positive potential on the positive line 12 is removed and negative potential is applied on the negative line 13. Referring to the left portion of FIG. 2, this negative potential through resistance R5 is applied to the base of transistor Q1 turning this transistor on to thereby apply positive potential by way of lead 25 from the ground lead means 15 (G1 and G) to one side of the relay coil A. The removal of the positive potential from the positive line 12 in turn, will turn transistor Q2 off which in turn turns transistor Q3 off. Turning off of transistor Q3 removes positive potential applied through the lead 23 and the closed switch arm B3 to resistance R4 thereby turning transistor Q4 on. With Q4 turned on or conducting, negative potential from the line 22 is applied through the closed switch arm B4 to the other side of relay coil A.

Relay coil A will now be energized throwing its corresponding switch arms A1 through A5 to their other terminals. Thus relay switch arms A1 and A3 shown in positive line 12 and negative line 13 open or disconnect these lines between the central office and the PABX trunk circuit. Also arm A2 opens the line in lead 21 extending from the line 12 through resistance R1 to the base of transistor Q2. The separation of the central office from the PABX trunk circuit is maintained until completion of release by the customer station and reconditioning of the PABX terminal, such completion being signalled by removal of positive potential from the ground lead means G and G1.

When ground or +48V is removed from the ground lead means 15, it is also removed from the line 26 and emitter of transistor Q1 passing to the relay coil A and from the line 24, diode CR5 and switch arm B1 to the relay B, thereby de-energizing both of these relays and permitting their associated siwth arms to be restored to their original positions wherein the positive and negative lines 12 and 13 from the central office to the PABX trunk circuit are reestablished by the switch arms A1 and A3.

The PABX terminal is protected from glare during this separation interval thus reducing by a substantial amount (one tenth to one fifth) the time period during which glare could otherwise occur in the absence of the guard circuit.

Some PABX trunk circuits will not release until the customer station has gone "on hook." To eliminate complaints of "ring-no answer," the guard circuit may optionally be provided with additional circuitry in the form of a busy signal generator 20, switch arm A4, diode CR3 and switch arm A5. With this additional circuitry, the switch arm A3 shown in the upper left of FIG. 2 will connect the busy signal generator 20 to alert the customer station under this condition when the relay A is energized. Further, the line to the central office is busied by reseizing the central office equipment through switch arm A4, diode CR3 and A5, this reseizing connecting the line 13 to the ground lead means 15. These three switch arms, of course, will be immediately restored to their original positions when the relay A is de-energized by loss of positive potential on the ground lead means 15.

In the case of outgoing calls, the circuit of FIG. 2 as described thus far works in essentially the same manner upon release by the calling party.

The central office circuits in telephone equipment of the type under consideration are not always the same. Certain central office circuits in fact are unique in that they can be seized, return positive potential on the positive trunk line 12 and then, because registers are not available, the circuit will release, removing the positive potential from the positive line to force a second (or third, or fourth) demand for service.

At the time of the foregoing forced relase, the PABX trunk circuit is subject to "glare" or in some cases the circuit is released back to the PABX station and the station must radial the access code to establish a new demand.

To overcome the foregoing situation, the guard circuit of this invention is designed to maintain the original demand with no delay or recycling of the PABX trunk circuit. Towards this end, and referring again to FIG. 2, when positive potential is first placed on the positive line 12, the transistors Q2 and Q3 turn on as described. Transistor Q3 in addition to placing positive potential on the time delay TD-1 to operate relay B after the delay, also places a positive potential on the base of transistor Q5 through diode CR8, keeping Q5 turned off. If the positive potential is removed from the positive line 12 before relay B operates transistors Q2 and Q3 are turned off removing the positive potential to relay B and transistor Q5. Transistor Q5 will therefore turn on from the negative potential provided through resistance R7 and switch arm B which has not yet been operated, thereby providing a positive holding potential from the PABX ground lead means 15, diode CR10, transistor Q5, diode CR2 and switch arm B2 to the positive line 12 to maintain the demand for service. The delay in operation of the relay B is sufficient to cover this operation.

In addition to the foregoing situations, certain types of equipment such as cross bar functions to remove potential from both sides of the two wire trunk line after all digits of a telephone number have been dialed, for approximately 300 milliseconds while the call is being established. The removal of the positive potential will allow transistor Q4 to turn on as described thereby placing negative potential at one side of the relay coil A. However, transistor Q1 will be turned off because of the loss of negative potential on the second line 13 to the base of transistor Q1 through resistance R5 thereby removing positive potential from the ground lead means 15 to the other side of relay A. Thus, relay A will not be energized or operate. When the potential is again applied to the positive and negative lines, transistor Q1 turns on but transistor Q4 turns off, thus again preventing the operation of relay A.

From the foregoing, it will thus be evident that the guard circuit of this invention provides many desirable features enabling the same to be compatible with various types of ground start customer terminal equipment and central office equipment. Although, as stated heretofore, the guard circuit can be provided as an independent circuit capable of simply being connected into the two wire trunk and PABX or other type customer terminal equipment where new PABX or equivalent ground start customer equipment is manufactured, the guard circuit of this invention can be incorporated directly in the original design.

While the switching and monitoring operations have been described as carried out by fast acting transistors and relays, equivalent electronic switching means for performing the same functions can of course utilized. The invention, accordingly is not to be thought of as limited to the specific circuits set forth merely for illustrative purposes.

What is claimed is:

1. A guard circuit for ground start telephone equipment made up of a central office connected through a two wire trunk comprising positive and negative lines to customer terminal equipment with ground lead means, said guard circuit including in combination:
   a. switch means connected to said positive and negative lines and responsive to removal of positive potential from the positive line and application of negative potential to the negative line when a call on said two wire trunk is released at said central office, to disconnect said two wire trunk between said central office and said terminal equipment; and,
   b. monitoring means connected between said ground lead means at said terminal equipment and said switch means and responsive to removal of positive potential from said ground lead means upon completion of release and reconditioning of said terminal equipment to receive a subsequent call, to reset said switch means and thereby reconnect said two wire trunk between said central office and terminal equipment, the period of time that the terminal equipment is subject to glare being reduced by the time interval that said central office is disconnected from said terminal equipment by said guard circuit so that the terminal equipment is subject to glare only during a reduced time period of from one tenth to one fifth the time period such equipment would be subject to glare in the absence of said guard circuit.

2. A circuit according to claim 1, including busy signal generating means, said switch means including means for connecting said busy signal generating means to the negative line connecting to said terminal equipment and for connecting the ground lead means to the negative line connectng to said central office to reseize the central office, in response to the release of the call at said central office to thereby provide a busy signal to any new call at the terminal equipment and at the central office during said time interval that said central office is disconnected from said terminal equipment.

3. A circuit according to claim 1, including additional switch means connected between said ground lead means and the positive line connecting to said terminal equipment and responsive to removal of positive potential from said positive line to close and immediately supply positive potential to said positive line by way of said ground lead means to thereby maintain the demand for service in those instances in which recycling of the terminal equipment would otherwise be necessary to maintain the demand, and thereby avoid the possibility of glare during such recycling time, said monitoring circuit means including time delay means introducing a delay period before connection of said monitoring circuit means to said ground lead means is established, said additional switch means being responsive to the connection of said monitoring circuit means to said ground lead means at the end of said delay period, to open.

4. A circuit according to claim 1, in which said switch means includes means responsive to simultaneous removal of both positive and negative potential from said positive and negative lines respectively to inhibit the disconnection of said two wire trunk from said central office to said terminal equipment should such simultaneous removal of both potentials occur, whereby a telephone call is not interrupted prior to release of the call at the central office.

5. A circuit according to claim 1, in which said switch means and monitoring circuit means includes switching transistors and fast acting relays to aid in reducing the time period that said terminal equipment is subject to glare.

* * * * *